United States Patent
Duley et al.

(10) Patent No.: US 6,977,355 B2
(45) Date of Patent: Dec. 20, 2005

(54) TAILORED BLANK

(76) Inventors: Walter Duley, 324 Amberwood Dr., Waterloo, Ontario N2T 2G1 (CA); Melih Ogmen, R.R.#1, Arliss, Ontario N0B 1B0 (CA); David Hughes, 5 Riverside Crescent, Toronto, Ontario M6S 1B5 (CA); Gary Keith Black, 120 Walmer Rd., Apt. 190 2, Toronto, Ontario (CA); Brian Morris, 10 Timpson Dr., Aurora, Ontario L4G 5K6 (CA); Michael James Staples, 7115 Frontier Ridge, Mississauga, Ontario (CA)

( * ) Notice: Subject to any disclaimer, the term of this patent is extended or adjusted under 35 U.S.C. 154(b) by 0 days.

(21) Appl. No.: 10/171,538

(22) Filed: Jun. 17, 2002

(65) Prior Publication Data

US 2003/0087117 A1 May 8, 2003

Related U.S. Application Data

(63) Continuation-in-part of application No. 09/694,889, filed on Oct. 25, 2000, now abandoned, and a continuation-in-part of application No. 09/341,575, filed as application No. PCT/CA97/00854 on Nov. 13, 1997, now Pat. No. 6,426,153.

(30) Foreign Application Priority Data

Jan. 14, 1997 (GB) .............................. 9700652

(51) Int. Cl.⁷ .......................... B23K 26/00; B23K 33/00
(52) U.S. Cl. ............................. 219/121.64; 228/173.6; 428/577; 428/579; 428/582; 428/614
(58) Field of Search .................................. 428/577, 578, 428/579, 582, 596, 614; 219/121.63, 121.34; 228/173.2, 173.6, 173.3

(56) References Cited

U.S. PATENT DOCUMENTS

| 1,446,274 | A |   | 2/1923  | Roberts |
| 2,660,909 | A | * | 12/1953 | Morse et al. ................. 72/211 |
| 2,692,425 | A | * | 10/1954 | Martin ..................... 29/402.12 |

(Continued)

FOREIGN PATENT DOCUMENTS

| CA | 2147915 C    | 6/2001 |
| DE | 4210547 C1   | 6/1993 |
| DE | 4307563 A1   | 9/1993 |
| DE | 19835997 A1  | 2/2000 |
| EP | 0276664 A1   | 9/1988 |
| EP | 0327320 A1   | 9/1989 |
| JP | 59092189     | 5/1984 |
| WO | WO 97/26110 A1 | 7/1997 |
| WO | WO 98/31485 A1 | 7/1998 |

OTHER PUBLICATIONS

In Re James H. Casey, No. 7718, United States Court of Customs and Patent Appeals, 54 C.C.P.A. 938; 370 F.2d 576; 1967 CCPA Lexis 416; 152 U.S.P.Q. (BNA) 235, Oral Argument Dec. 7, 1966, Jan. 12, 1967.

In Re Carl Louis Otto, Lanelle Burham Otto and Joan Briton, No. 6910, United States Court of Sutoms and Patent Appeals, 50C.C.P.A. 938; 312 F.2d 937; 1963 CCPA Lexis 411; 136 U.S.P.Q. (BNA) 458, Oral Argument Jan. 7, 1963, Feb. 13, 1963.

*Primary Examiner*—John J. Zimmerman
(74) *Attorney, Agent, or Firm*—John R.S. Orange; Blake Cassels & Graydon LLP

(57) ABSTRACT

The present invention provides a tailored blank having a pair of sheet metal constituent parts each having a pair of oppositely directed major surfaces. The first constituent part has an aperture while the second constituent part has an embossment to fit the aperture. The first and second constituent parts are then secured to one another to form the tailored blank. The blank may then be subsequently formed into a component of varying material characteristics.

1 Claim, 13 Drawing Sheets

U.S. PATENT DOCUMENTS

| | | |
|---|---|---|
| 3,848,314 A | 11/1974 | Stohr |
| 4,231,488 A | 11/1980 | Ward et al. |
| 4,559,274 A | 12/1985 | Kloppe et al. |
| 4,603,089 A | 7/1986 | Bampton |
| 4,641,432 A | 2/1987 | Kume |
| 4,661,677 A | 4/1987 | La Rocca |
| 4,695,699 A | 9/1987 | Yagii et al. |
| 4,738,560 A * | 4/1988 | Brussow et al. ............ 403/268 |
| 4,873,415 A | 10/1989 | Johnson et al. |
| 4,945,202 A | 7/1990 | Büdenbender |
| 5,131,710 A | 7/1992 | Kamiguchi et al. |
| 5,245,156 A | 9/1993 | Kamogawa et al. |
| 5,250,783 A | 10/1993 | Nishi et al. |
| 5,603,853 A | 2/1997 | Mombo-Caristan |
| 5,634,255 A | 6/1997 | Bishop |
| 5,797,187 A | 8/1998 | Leini |
| 5,951,114 A | 9/1999 | Marron et al. |
| 5,984,163 A | 11/1999 | Meier et al. |
| 5,994,666 A | 11/1999 | Buldhaupt et al. |
| 6,048,628 A | 4/2000 | Hillmann et al. |
| 6,060,682 A | 5/2000 | Westbroek et al. |
| 6,560,838 B1 * | 5/2003 | Ito et al. .................. 29/402.11 |

* cited by examiner

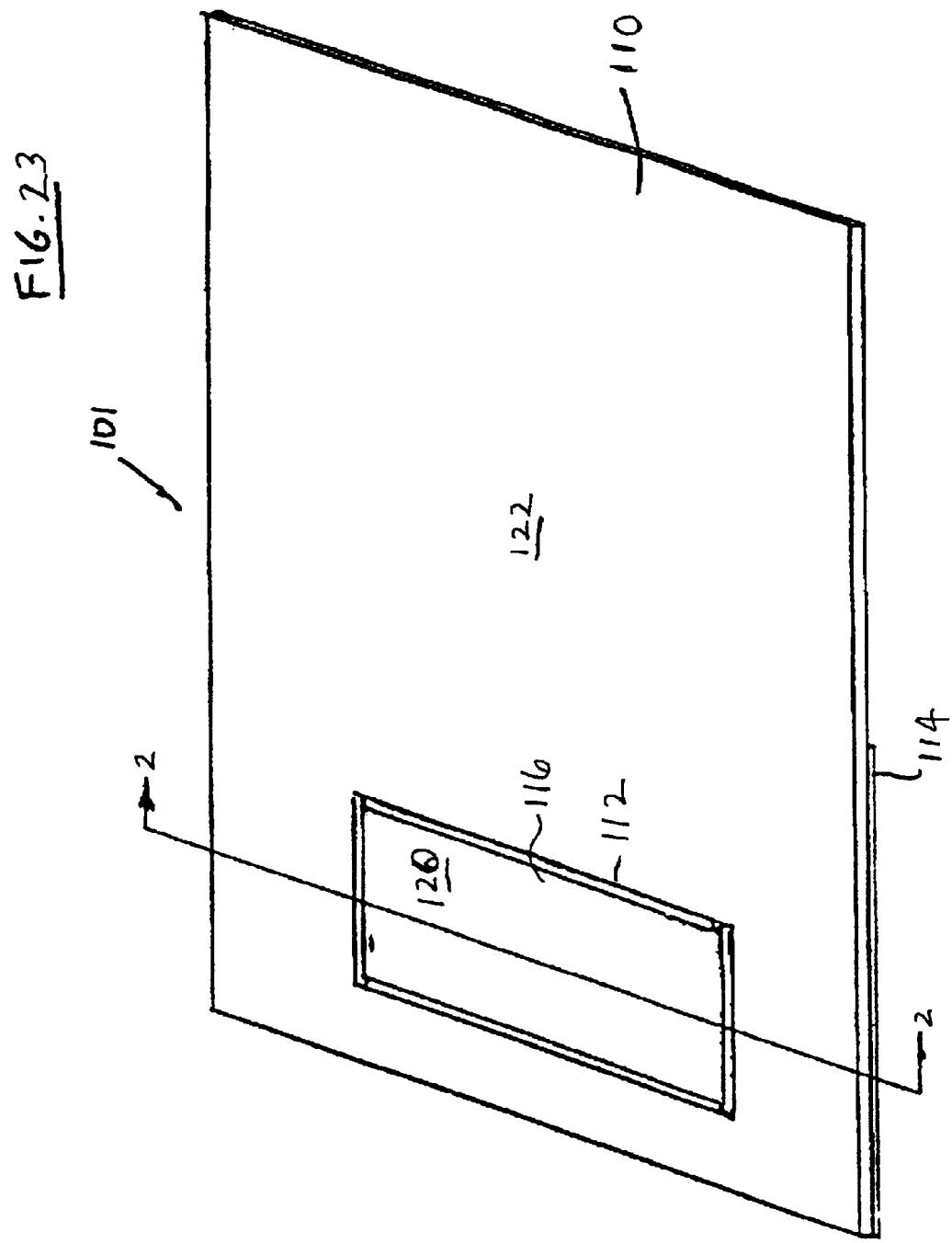

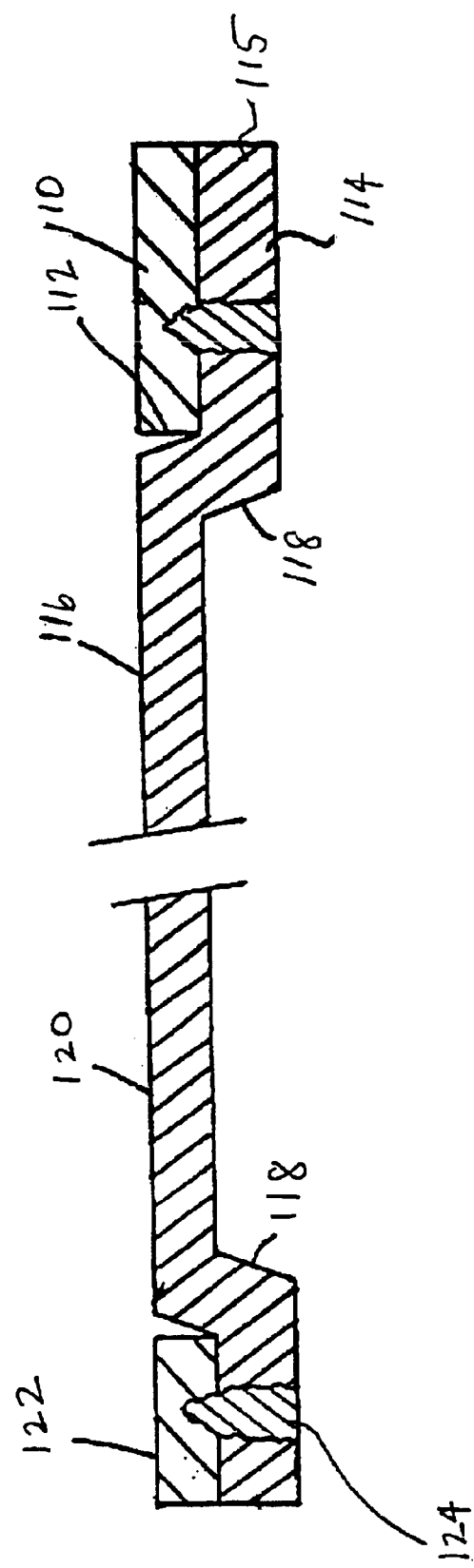

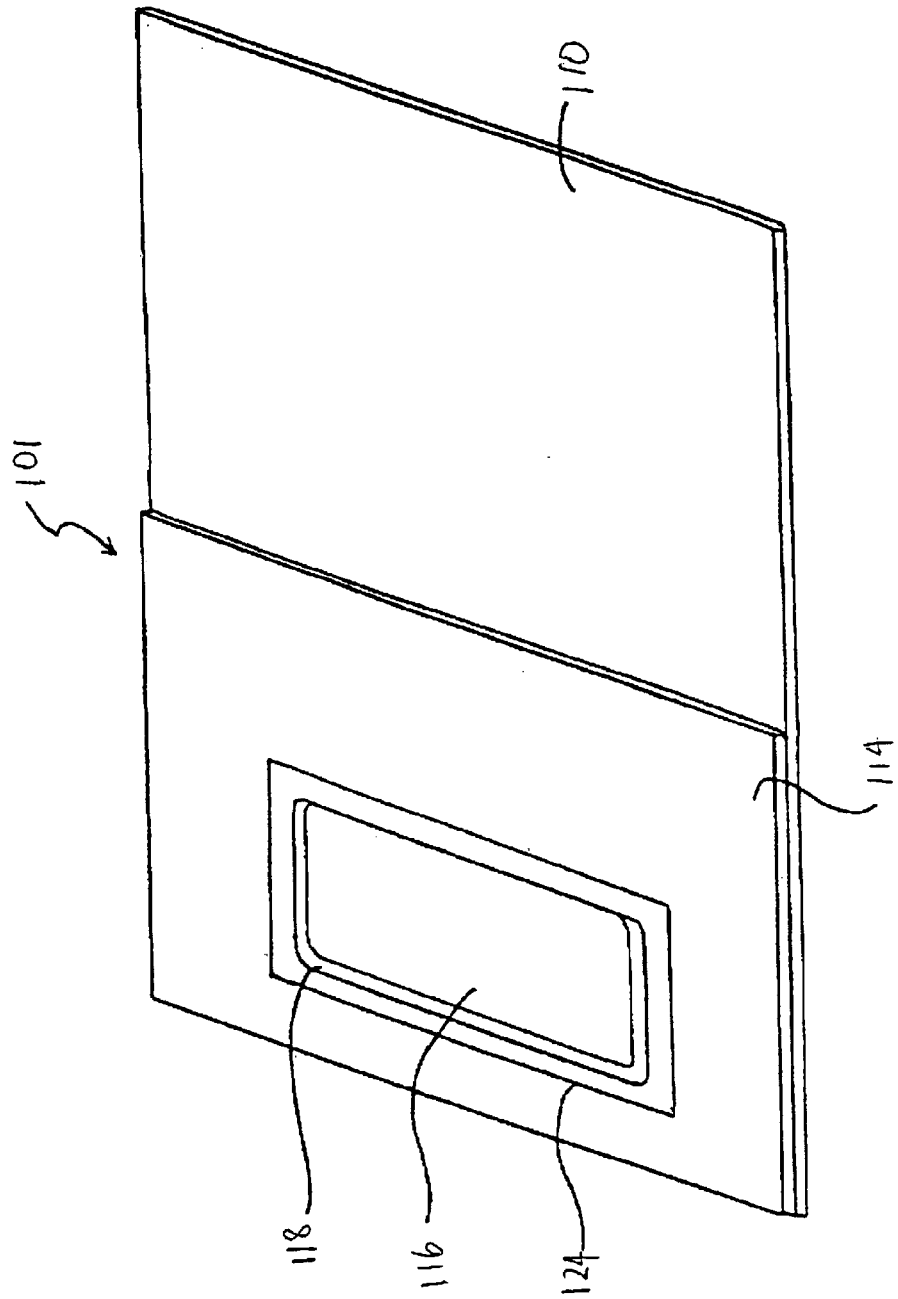

TAILORED BLANK

This application is a Continuation-In-Part of U.S. Ser. No. 09/694,889 filed on Oct. 25, 2000 now abandoned and U.S. Ser. No. 09/341,575 filed on Oct. 1, 1999, now U.S. Pat. No. 6,426,153 which is a 371 of PCT/CA97/00854 filed on Nov. 13, 1997 the contents of which are incorporated herein by reference.

FIELD OF THE INVENTION

The present invention relates to a method of forming tailored blanks to be used to produce shaped metal components.

BACKGROUND OF THE PRIOR ART

Sheet metal components of complex shapes are typically produced from a planar blank that is formed into the finished shape through a series of forming or stamping operations. Where relatively complex components are to be produced, it is usual to build the component out of a number of individual elements, each of which is stamped from a blank. The need to use multiple components may result from the complexity of the finished product or may result from the different characteristics of the material required in different areas of the component. For example, if the component is a door frame of an automobile, the majority of the door frame may be formed from a relatively thin metal sheet but the mounting points for the hinges of the door require extra strength. The use of multiple elements to produce the finished component increases the manufacturing complexity.

To mitigate this complexity, it has been proposed to produce a tailored blank in which appropriately shaped sheets of material are connected edge to edge by a laser welding process to produce a unitary blank. When formed, the blank produces a component with differing material characteristics through the structure. This process permits optimum use of the material but at the same time minimizes the subsequent assembly of multiple elements into the final component.

The production of a tailored blank requires the constituent sheet metal parts to be cut accurately so that the laser welding may be performed efficiently and retain an adequate weld quality. This requires precision cutting of the constituent components and in our published Application Nos. 9624039.5 filed Nov. 19, 1996, 9624652.5 filed Nov. 27, 1996 and Application No. 9700251.3 filed Jan. 8, 1997, each of which were filed in Great Britain and are abandoned, various methods are described to mitigate the difficulties encountered with obtaining the required precision from the constituent parts. However, in certain circumstances, it is desirable to produce a formed component with a very high quality surface finish so that subsequent processing such as painting can be accomplished with a minimum of refurbishment of the surface after welding. While laser welding offers in general a relatively high-quality welded surface and the processes contemplated in the above-mentioned applications further facilitate the production of a smooth outer surface, there is nevertheless the need for a tailored blank that may be used directly to produce a finished surface.

It is therefore an object of the present invention to obviate or mitigate the above disadvantages.

SUMMARY OF THE INVENTION

In general terms, the present invention provides a method of forming a component from a tailored blank having two constituent parts comprising the steps of providing a first constituent part having an aperture; providing a second constituent of substantially uniform cross section having an embossment to fit the aperture and a surrounding flange to extend beyond the periphery of the aperture and overlap the first constituent part, the embossment being offset from the flange by the thickness of the first constituent part; positioning the first and second constituent parts in face to face relation with the second constituent part nesting the embossment within the aperture; securing the first and second constituent parts to one another to form a substantially planar tailored blank by laser welding the flange to the first constituent part by continuously welding between the flange and first constituent part, wherein the step of nesting the embossment in the aperture results in a flush surface between the first constituent part and the embossment; and deforming the blank the provide the component.

BRIEF DESCRIPTION OF DRAWINGS

Embodiments of the invention will now be described by way of example only, with reference to the accompanying drawings in which

FIGS. 23–25 are a series of schematic representations of a further embodiment of a blank.

DESCRIPTION OF PREFERRED EMBODIMENT

Figure 1:
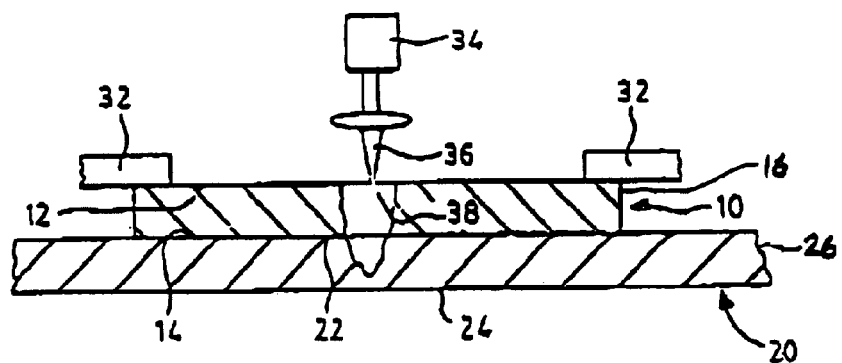
FIG. 1 is a sectional view of a pair of constituent parts prior to processing.
Figure 2:
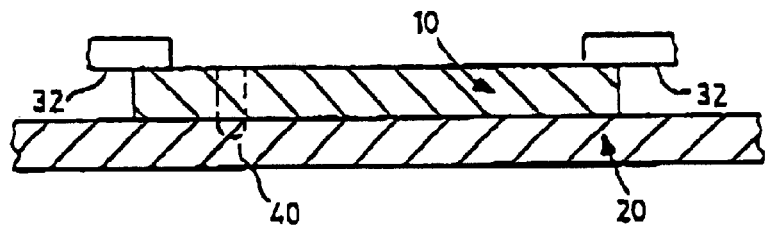
FIG. 2 is a sectional view of the components after processing.

Referring therefore to FIG. 1, a pair of constituent parts 10, 20 which may have differing characteristics—in this case differing thicknesses—are each planar and formed from weldable sheet metal. As such, each has a pair of oppositely directed major surfaces 12, 14 and 22, 24 interconnected at the periphery by edges 16, 26 respectively.

The constituent parts 10, 20 are positioned in juxtaposition with one major surface 14 of the constituent part 10 overlying and in abutment with one of the major surfaces 22 of the constituent part 20. The constituent part 10, which is of smaller area than that of the constituent part 20, is positioned within the periphery of part 20 such that after forming, an increased thickness of material will be available in the desired region of the finished component.

The constituent parts 10, 20 are secured in abutting relationship by clamps 32 of suitable form including magnetic clamps if the components themselves are magnetic. A laser 34 directs a beam 36 onto the exposed major surface 12 of the constituent part 10 and produces local melting of the constituent part 10 and the major surface 22. The beam 36 is controlled so that partial penetration of the component 20 is obtained but the liquid region 38 does not extend to the lower surface 24. The irradiated area may be shielded with an inert gas in a conventional manner as appropriate.

The beam 36 is caused to translate relative to the constituent parts 10, 12 along a predetermined path so that as the beam 36 moves, the constituent part 10 and part of the constituent part 20 melt locally in the region indicated by numeral 38. Continued movement of the beam 36 allows the region 38 of the constituent parts 10, 20 to solidify after passage of the beam and be joined to one another as indicated by weld 40.

Figure 3:
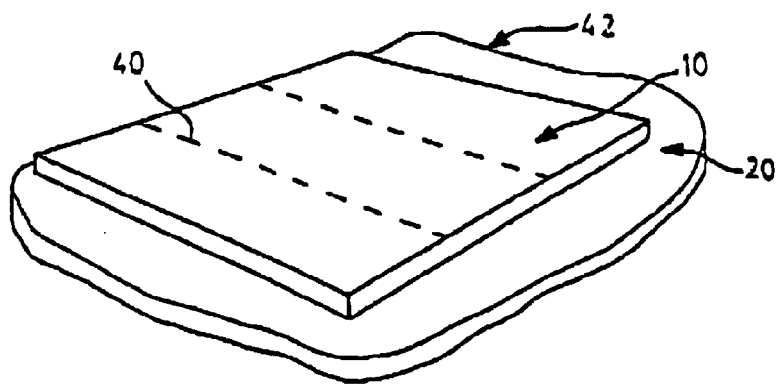
FIG. 3 is a top perspective view of the components after processing.

As indicated in FIG. 3, the beam 36 is repositioned laterally to provide welds at spaced locations and thereby secure the one constituent part 10 to the other constituent part 20. Alternatively, multiple beams may be used to produce welds simultaneously.

Figure 4:
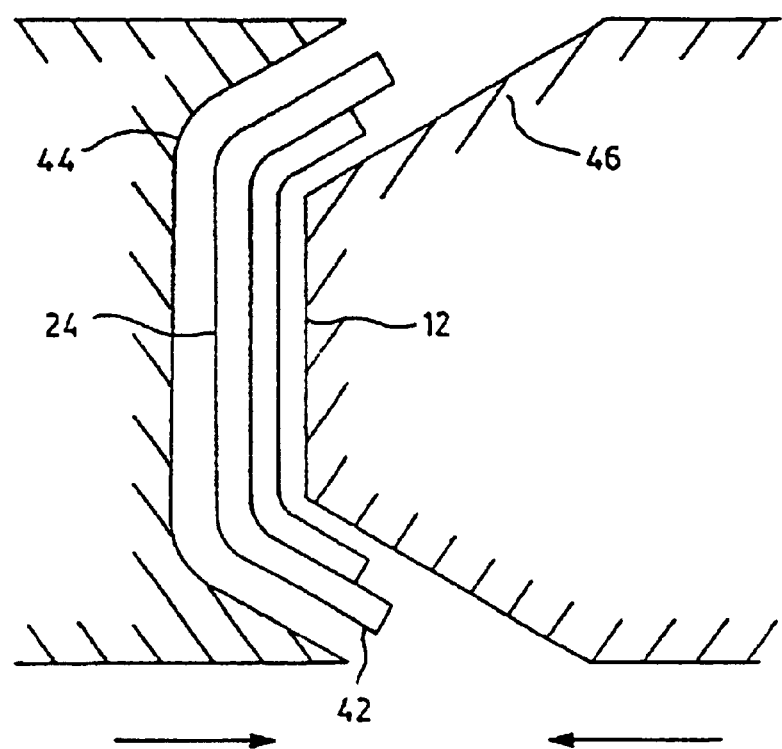
FIG. 4 is a schematic representation of a part formed from the components of FIG. 3.

After welding, the constituent parts 10, 20 provide a unitary tailored blank 42 which may then be subsequently formed into a component of the required shape as shown schematically in FIG. 4. A pair of complementary dies 44, 46 engage opposite faces 12, 24 of the blank 42 to form it into a shape defined by the dies. The components 10, 20 are each formed resulting in a finished component of the desired complex shape.

By controlling the beam 36 such that melting only proceeds part way through the constituent part 20, the major surface 24 is not adversely affected by the welding process and therefore presents a continuous smooth surface that may not require additional processing prior to finishing. At the same time, the blank provides varying material characteristics in the finished component. It will be appreciated that full penetration of the constituent part 20 may be permitted where final surface finish is not significant.

In tests conducted with the composite blank 42 shown in FIG. 3, the following parameters were utilized:

| | |
|---|---|
| relative speed between laser beam and the constituent part: | 6.2 metres per minute |
| laser beam power: | 6 kilowatts utilizing a $CO_2$ continuous laser; |
| laser beam mode: | $TEM_{01}$ |
| laser beam diameter: | 0.028 inches |
| shield gas: | helium above, argon below; |
| thickness of constituent part 20: | $t^1$ = 0.034 inches; |
| thickness of constituent part 10: | $t^2$ = 0.074 inches; |
| constituent part material: | galvaneal (hot rolled galvanized mild steel) |

Naturally the constituent parts may be similar to one another having the same thickness and composition or may be selected with different characteristics, such as thickness, composition, coating or the like. By selecting the constituent part 10 of the appropriate characteristics, the unitary blank 42 is formed with a uniform surface but with local reinforcements to provide varying characteristics in the formed component. In one particularly beneficial embodiment, the constituent part 20 is zinc coated and the constituent part 10 is cold rolled steel. The surface 24 of the part 20 is thus not affected by welding to provide a continuous zinc coated surface that may be used as an exterior paint surface and/or for corrosion resistance.

Figure 5:
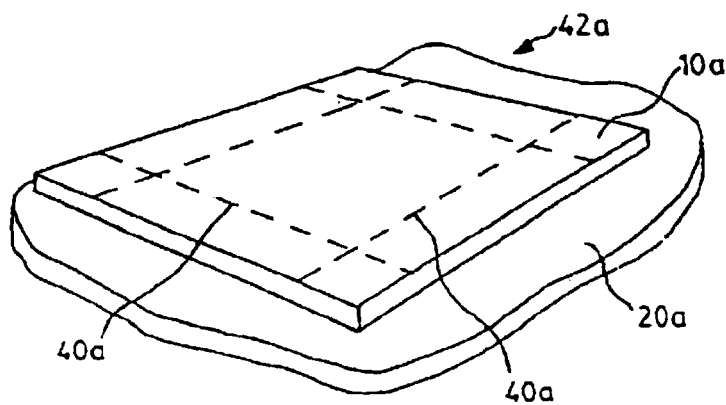
FIG. 5 is an alternative embodiment of tailored blank.

Alternative arrangements of constituent parts and welding may be utilized to produce the required tailored blank. For example, as shown in FIG. 5, the constituent part 10a is secured to the constituent part 12a through intersecting lines of welds 40a indicated so that the constituent part 10a is secured about its entire periphery to the constituent part 12.

Figure 6:
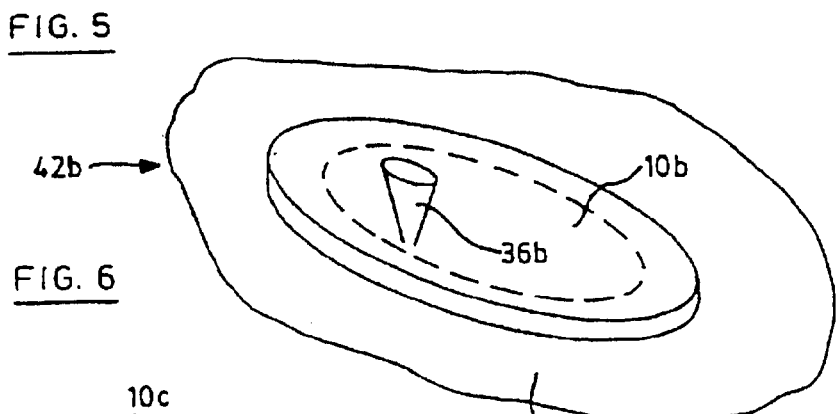
FIG. 6 is a further embodiment of a tailored blank.

As shown in FIG. 6, the constituent part 10b need not be rectangular or even of regular shape, and the laser beam 36b may be moved along a path conforming to the periphery of the constituent part 10b to secure it to a differently-shaped constituent part 20b.

Figure 7:
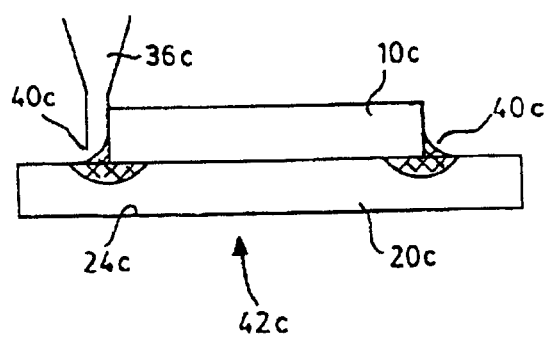
FIG. 7 is a sectional view of an alternative processing arrangement of a tailored blank.

The above embodiments contemplate the welding of the constituent part at a location spaced from the periphery of the constituent part 10a. However, as indicated at FIG. 7, the constituent part 10c may be welded to the constituent part 12c by following the edge of the constituent part and providing a lap weld 40c along the periphery of the constituent part 10c. Again, where the major surface 24c is to be used as a finished surface, the beam 36c is controlled to limit penetration through the constituent part 20c.

Figure 8:
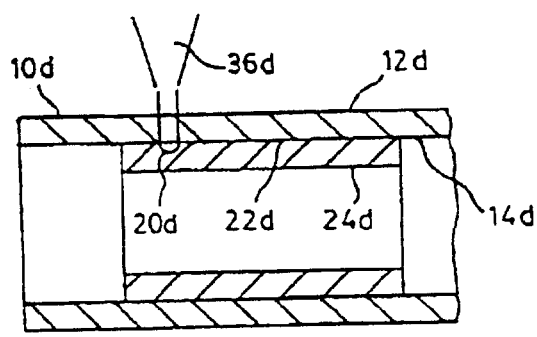
FIG. 8 is a sectional view showing the processing of tubular components.

The above embodiments show the formation of tailored blanks from generally planar constituent parts. However, as indicated in FIGS. 8–11, tubular constituent parts 10d, 20d may be utilized to provide local reinforcement in the walls of a tubular blank. As seen in FIG. 8, the constituent part 10d is tubular and located within tubular component 20d. Laser beam 36d impinges on the radically outwardly-directed major surface 12d and penetrates to the abutting major surfaces 14d, 22d, to weld the two surfaces together. The tubular constituent part 20 d may be rotated about its longitudinal axis relative to the beam 36d to produce a circumferential weld.

The constituent parts 10d, 20d may of course be connected at longitudinally spaced locations to connect the constituent parts as required for subsequent forming.

Figure 9:
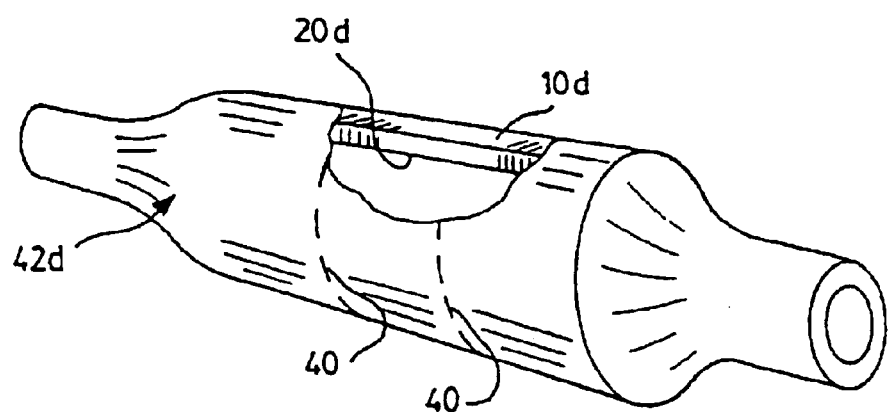
FIG. 9 is a perspective view of a finished component formed from the blank of FIG. 8.

This arrangement is particularly useful where the tubular blank 42d is to be used in a hydroforming operation where high pressure fluid is used to expand a tubular blank 42d into a die cavity. An example is shown in FIG. 9 where a radial expansion of the tubular blank 42d produces a bulbous frame component with varying wall thickness. The local reinforcement provided by the part 20d permits varying characteristics to be obtained along the length of the finished component.

Figure 10:
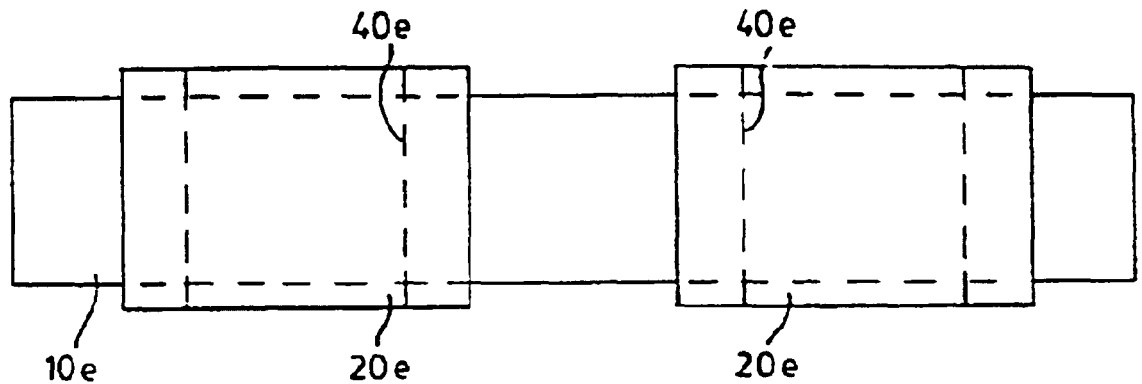
FIG. 10 is a side view of a further embodiment of blank similar to FIG. 9.
Figure 11:
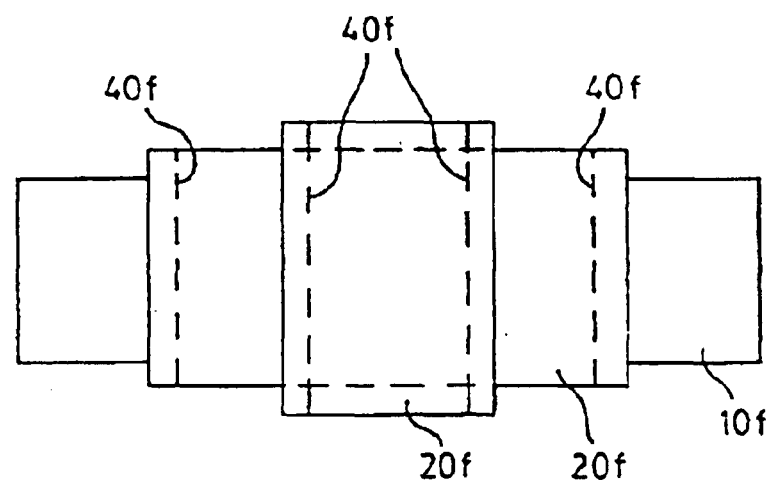
FIG. 11 is a side view of a yet further embodiment similar to FIG. 10.

As shown in FIG. 10, the constituent part 20e may be provided externally of the tube 10e and at a number of longitudinally spaced locations. This facilitates placement of the parts 20e and permits tailoring of the tubular blank 42e. When used in vehicle frames, the variation of wall thickness provided by constituent parts 10e, 20e permits a progressive crush resistance to be obtained for the finished component. Similarly, as illustrated in FIG. 11, multiple constituent parts may be stacked on top of one another to provide further variation in wall thickness. Of course, a similar stacking may be accomplished with planar components illustrated in FIGS. 1–7.

Figure 12:
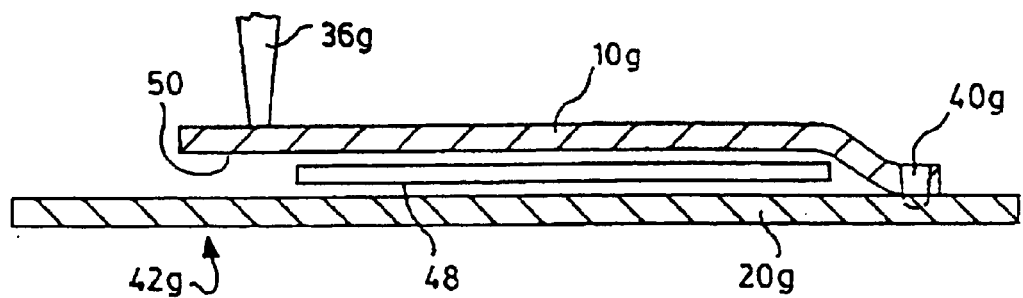
FIG. 12 is a section of an alternative arrangement of blank incorporating a supplementary component.
Figure 13:
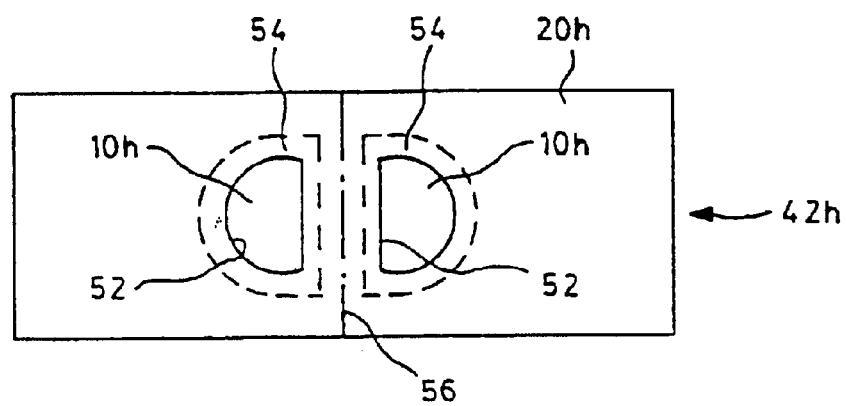
FIG. 13 is a plan view of a blank used in the forming of an automobile component.
Figure 14:
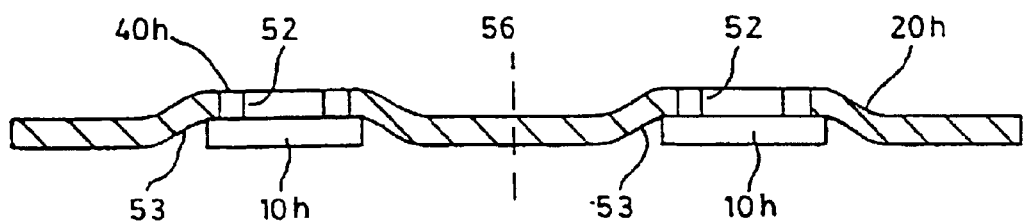
FIG. 14 is a section on the line 14—14 of FIG. 13.
Figure 15:
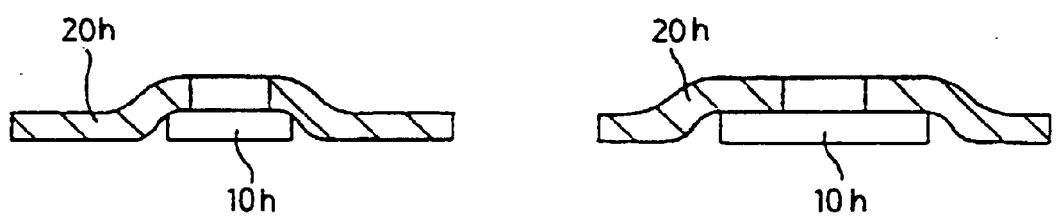
FIG. 15 is a section similar to FIG. 14 showing a subsequent step in the forming.

The lamination of the tailored blank 42 also enables supplementary materials to be incorporated into the blank 42. As shown in FIG. 12, the sound transmission characteristics may be modified by incorporating a non-metal layer 48, such as plastic or paper, between the constituent parts 10g, 20g. Typically, the intermediate layer 48 may be 0.004 inches thick and lies within the smaller constituent part 10g to separate the major surfaces 14g, 22g and provide a peripheral margin 50 in which contact between the surfaces 14g, 22g is not inhibited. The constituent parts may be seam welded around the peripheral margin 50 to inhibit moisture ingress or intermittently welded to retain the layer 48. The resultant tailored blank 42g may then be formed to the required shape in a press with the intermediate layer 48 retained in situ during forming.

Figure 16:
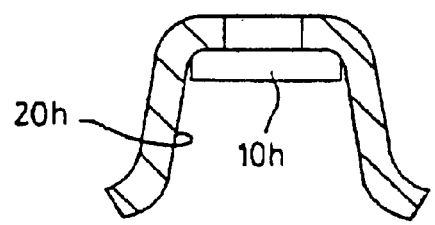
FIG. 16 is a sectional view of the finished component.
Figure 17:
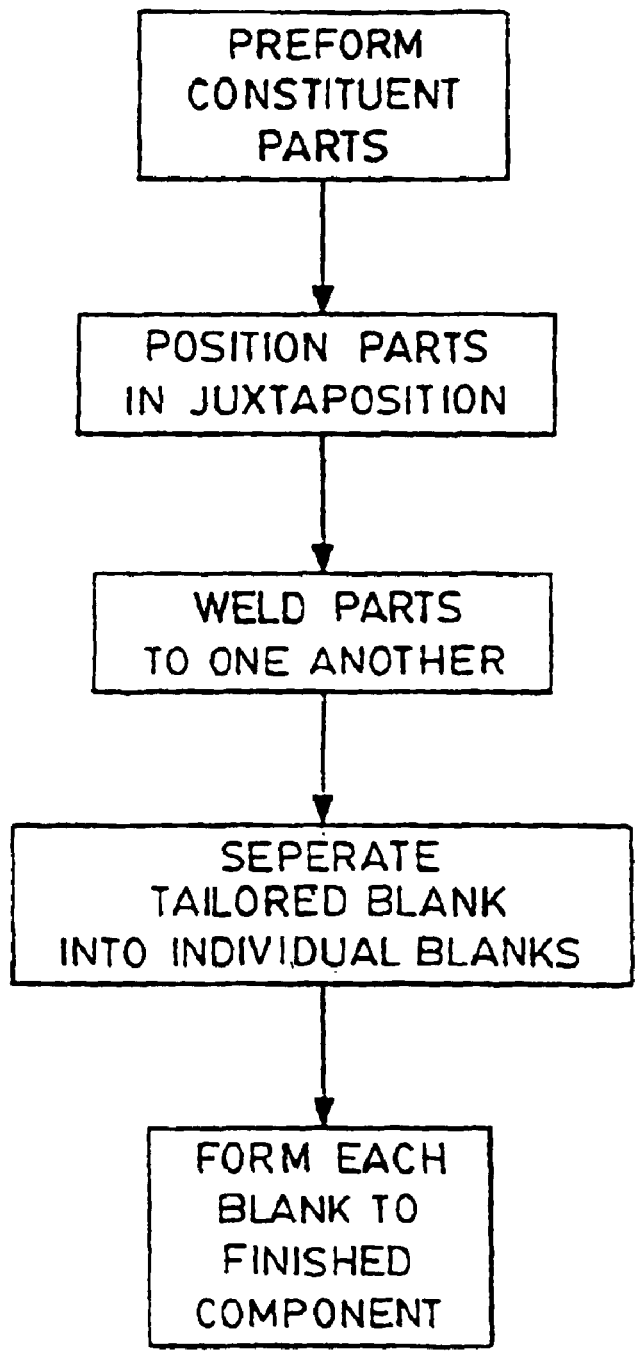
FIG. 17 is a flow chart showing the sequence of steps performed in FIGS. 13–16.

A further example of a component formed from a tailored blank is shown in FIGS. 13–16 where the formation of a shock tower for use in a vehicle body is shown using the process steps shown in FIG. 17. A shock tower is used to support suspension components in a vehicle and as such is subjected to severe local shear loadings. However, the shock tower is usually elongated to accommodate the vertical displacement of suspension components and therefore has a significant wall area.

A blank 42h is formed from a constituent part 20h and a pair of first constituent parts 10h. The second constituent part 20h is formed from a planar sheet of cold rolled steel with a pair of D-shaped cutouts 52 located in local depressions 53. The cutouts 52 and depressions 53 are provided in a preforming step by stamping a sheet of material in a conventional manner.

The first constituent parts 10h are cut from sheet stock which is thicker and of higher strength to serve as a mounting point and located over the cutouts 52. The parts 10h overlap the edges of the cutouts 52 within the depression to provide a peripheral margin 54 of juxtaposed parts. The depth of the depressions corresponds to the thickness of the parts 10h so that the major surfaces 24h and 14h are coplanar. A flat surface is thus provided to facilitate subsequent forming operations.

The constituent parts 10h, 20h are then laser welded to one another in the margin 54 with a continuous weld 40h as indicated above.

The resultant blank 42h contains two individual blanks for forming the shock towers and so is separated along a line of symmetry 56 into individual blanks. Each individual blank is then formed in a press into a shock tower as shown in FIG. 16 with walls of relatively thin material but with mounting plates provided with a double thickness by the constituent parts 10h.

The techniques described above may also be utilized to provide a blank incorporating non-weldable components, or components that are not compatible for welding to one another. For example, mild steel and aluminum are each weldable but when welded to one another brittle, intermetallic compounds are formed.

Figure 18:
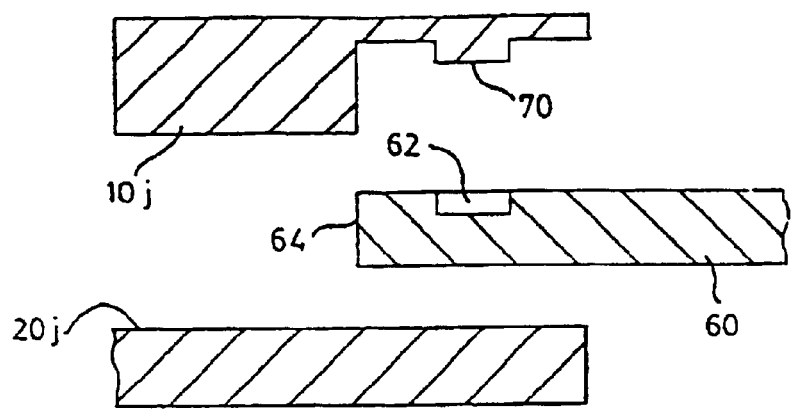
FIG. 18 is an exploded view of components of a further embodiment of blank.
Figure 19:
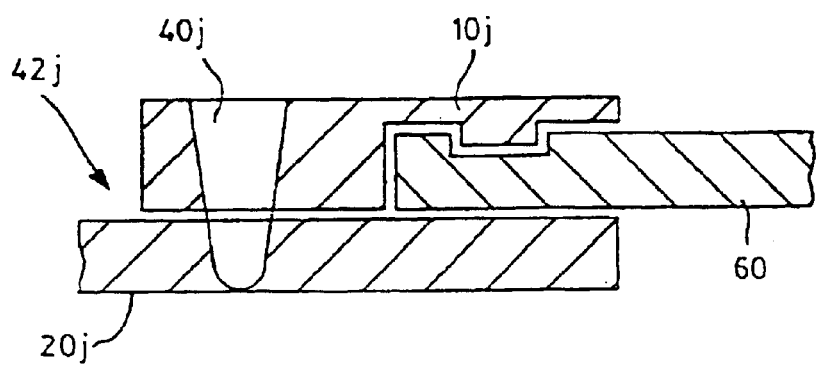
FIG. 19 is a side view of the assembled blank of FIG. 18.
Figure 20:
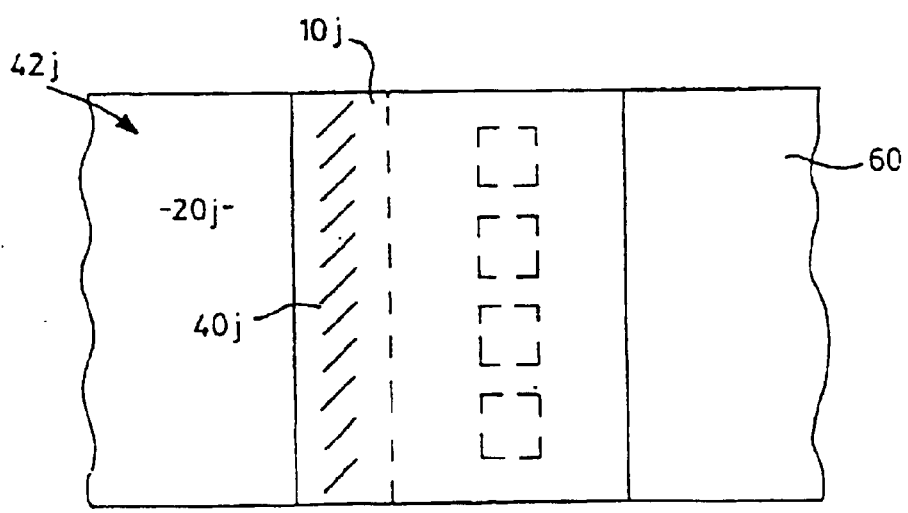
FIG. 20 is a plan view of FIG. 19.

One such arrangement is shown in FIGS. 18–20 in which a pair of constituent parts 10j, 20j are interconnected by welds 40j and are mechanically connected to an additional component 60. The component 60 is a plastics material and has a series of rectangular depressions 62 along marginal edges 64. An undercut 66 is formed on the edge of constituent part 10j with an undersurface 68 spaced from the major surface 24j by the thickness of the additional component 60. Projections 70 depend from the undersurface 68 and are complementary to the depressions 62 so as to be a snug fit within them.

The constituent parts 10j, 20j are positioned in juxtaposition with the component 60 located between. The projections 70 engage the depressions 62 so that the component 60 is mechanically locked to the part 10j. The parts 10j, 20j are then welded at 40j to connect them and secure the component 60. The resultant blank may then be formed with the mechanical connection retaining the integrity of the parts 10j and component 60. It will be appreciated that the component 60 may be a plastics composite, glass or other material not normally weldable or could be a dissimilar metal material such as aluminum.

In another embodiment, as shown in FIGS. 23–25, a blank assembly 101 comprises a first constituent part 110 with an aperture 112. Aperture 112 is shown as rectangular. However, it is readily understood that aperture 112 can be any shape. The aperture 118 is formed in the constituent part 110 by any known method, for example, cutting or punching.

A second constituent part 114 is provided with an embossment 116 to fit the aperture and a surrounding flange 115. The embossment 116 may be formed by any known method.

Embossment 116 includes a step 118 that preferably has a height equal to the thickness of the first constituent part 110. The embossment 116 should be the same shape as and slightly smaller than the aperture 112 to provide a complementary fit therein.

Embossment 116 is nested in aperture 112 such that constituent part 110 is juxtaposed in a face to face relation with constituent part 114. It is desirable for surface 120, where it is formed into embossment 116, to be flush with surface 122 of the first constituent part 110. This arrangement of providing a flat surface allows for improved material flow during subsequent forming process.

The size and location of aperture 112 and embossment 116 is determined by where extra strength is required for the tailored blank. Preferably aperture 112 and embossment 116 are spaced inwardly from the outer edge of the constituent part 110, 116 respectively.

A laser welder is directed along a path outside of the perimeter of the embossment 116 and aperture 112 thus joining the two constituent parts 110, 116 together. The second constituent part 116 must be of sufficient size to allow for a weld to join the blanks together. The weld 124 is typically a lap weld and the weld location does not need to be accurate. It is also possible to place a fillet weld between the edge of constituent part 110 and the embossment 116; however, this requires a higher precision operation. In another embodiment, the constituent parts 110 and 116 are secured via a mechanical connection.

Figure 21:
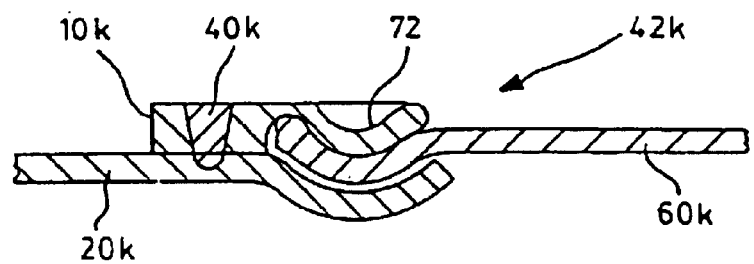
FIG. 21 is a section of a further embodiment of the blank shown in FIG. 19.

As a further alternative to the rectangular depressions 62, part-spherical recesses may be used as shown in FIG. 21. In this embodiment, recesses or "dimples" 72 are formed in each of the parts 10k, 20k and component 60k by a part-spherical punch and the parts 10k, 20k welded to one another to form an integral blank 42k.

The mechanical interconnection of the component 60 and parts 10, 20 may be utilized in a number of ways as shown in FIG. 22. The component 60 may be used to cover an aperture in the part 20 as shown in FIG. 22a, or may form a lining over a portion of the part 20 as shown in FIG. 22b.

Figure 22A:
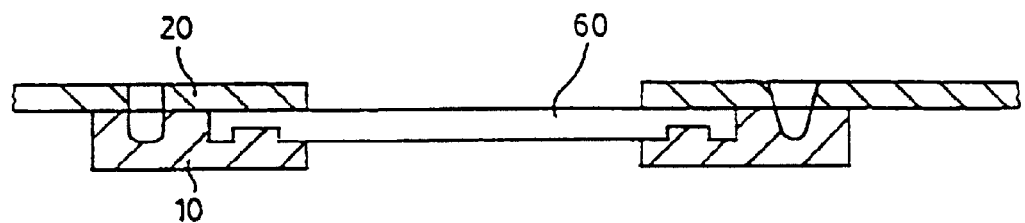
FIG. 22 is a series of schematic representations of blanks formed using the embodiments of FIGS. 18–21.
Figure 22B:
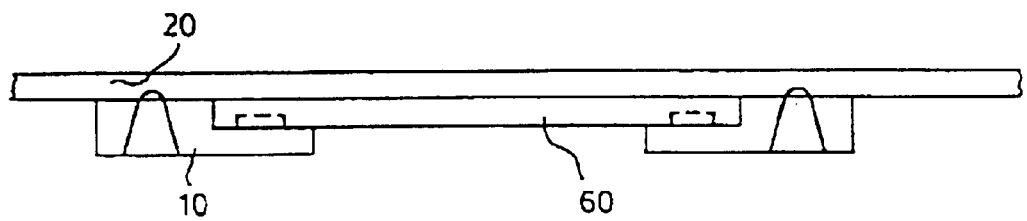
Figure 22C:
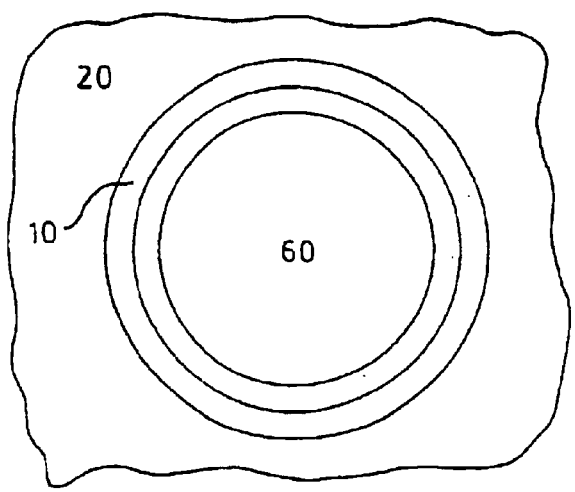
Figure 22D:
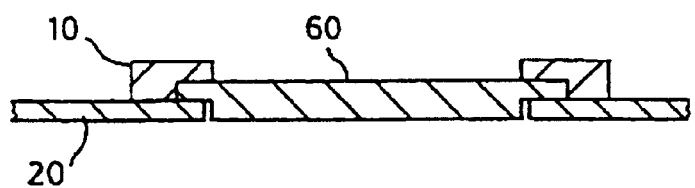
Figure 22E:
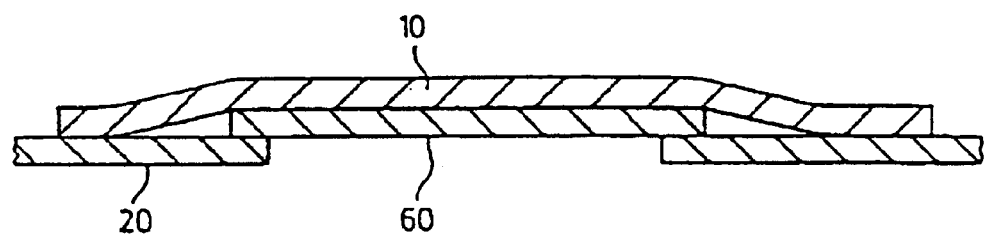
Figure 22F:
Figure 22G:
Figure 22H:

The component 60 may be circular as illustrated in FIG. 22c or may be formed with a peripheral rabett so that a flush surface is provided as shown in FIG. 22d.

In some circumstances, a positive mechanical connection is not necessary in which case a frictional location is obtained by deflection of one or both constituent parts as shown in FIGS. 22e–22h. In such arrangements, the component 60 is mechanically trapped by the constituent parts to permit subsequent forming operations.

It will be seen that the preparation of a tailored blank with constituent parts juxtaposed permits the blank to be formed with different material characteristics without the need for precision edge preparation of the parts.

Other typical applications in which the above embodiments find utility are the provision of a strengthening section in a door skin of a vehicle to receive a door lock assembly or mounting pads for attachment of seat belts on a floor pan of a vehicle.

Although laser welding is preferred, alternative welding techniques may be used such as MASH welding that permits the blank to be assembled and subsequently formed. The welding pattern will be selected to meet the structural requirements of the forming process, including the drawing properties of the blank and the components' subsequent use.

By securing the constituent parts into a blank prior to forming, the need for accurately fitting the parts for seam welding into a unitary blank is mitigated. Moreover, because the required material characteristics can be obtained from the blank, the need to weld additional components after the forming process is avoided. This is particularly significant as the accurate fitting of complex shapes after forming is difficult and time-consuming. A uniform closed surface may also be obtained without relying upon the integrity of the weld.

In each of the above embodiments, a continuous weld has been illustrated between the constituent parts. Where structural requirements permit, it is of course possible to provide localized welding at discrete locations over the constituent parts so that the constituent parts are held together during forming but a continuous weld is not necessary.

The embodiments of the invention in which an exclusive property or priviledge is claimed are defined as follows:

1. A method of forming a component from a tailored blank having two constituent parts, comprising the steps of providing a first constituent part having an aperture; providing a second constituent part of substantially uniform cross section having an embossment to fit the aperture and a surrounding flange to extend beyond the periphery of said aperture and overlap the first constituent part, the embossment being offset from the flange by the thickness of the first constituent part; positioning said first and second constituent parts to face to face relation with said second constituent part nesting said embossment within said aperture; securing the first and second constituent parts to one another to form a substantially planar tailored blank by laser welding said flange to said first constituent part by continuous welding between the flange and first constituent part, wherein said step of nesting said embossment in said aperture results in a flush surface between said first constituent part and said embossment; and deforming said blank to provide said component.

* * * * *